April 12, 1932. J. B. ESTES 1,853,852
POTLID HANDLE AND UTENSIL SUPPORT
Filed Feb. 8, 1929
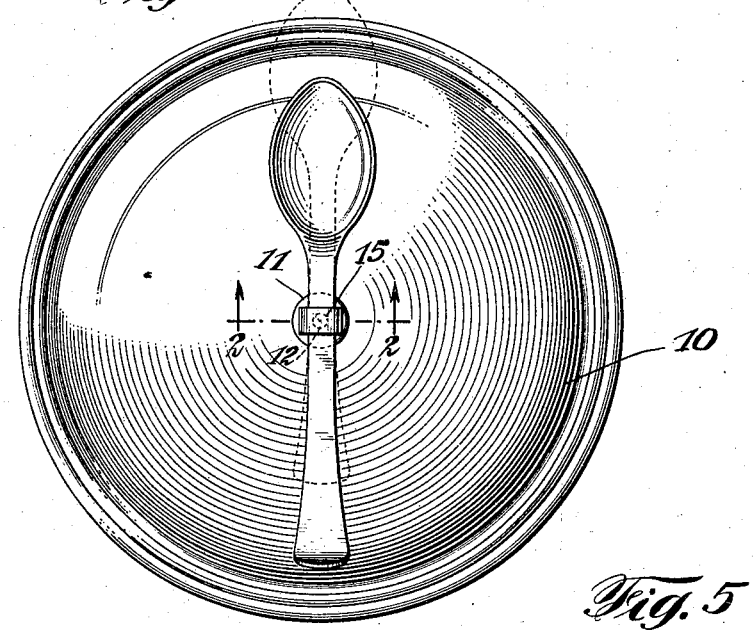
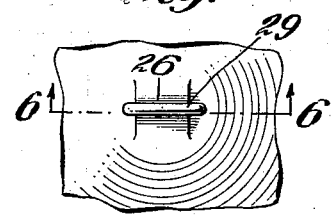
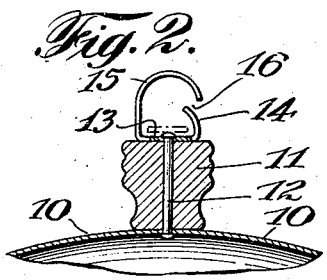
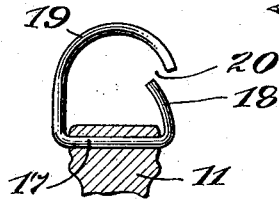
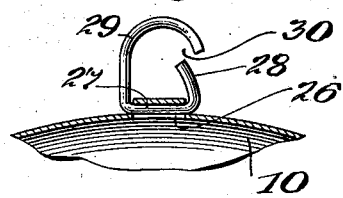
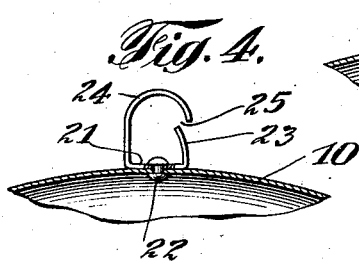
INVENTOR
Joseph B. Estes
BY
his ATTORNEYS Patented Apr. 12, 1932

1,853,852

UNITED STATES PATENT OFFICE

JOSEPH B. ESTES, OF NEW YORK, N. Y.

POTLID HANDLE AND UTENSIL SUPPORT

Application filed February 8, 1929. Serial No. 338,381.

In the use of pots, pans and kettles and other utensils in cooking it is customary and oftentimes necessary to employ a spoon for stirring the food. It is also customary to employ a suitable lid to normally close the vessel during the cooking operation. So far as I am aware, however, no provision at present exists for employing a suitable and always handy support or rest for a spoon or other utensil with a vessel used for cooking purposes. The object of my present invention is to overcome the inconvenience in having no adequate spoon rest and in doing so I propose to provide a handle so constructed as to function as an ever ready support for a spoon or other utensil, the same being preferably applied to the lid of a cooking vessel and so constructed that in conjunction with the spoon, or other utensil, it may also be employed as a lifter for the lid.

To this end in carrying out the invention the handle and utensil support may be directly connected to the lid itself, or may be associated with a knob of suitable heat insulating material, or otherwise, and is so constructed and associated with the lid as to form a support adapted to receive and maintain a spoon or other utensil relatively to the lid and to cooperate with the spoon or other utensil in acting as a lifter for the lid, the parts being so constructed and arranged that the spoon or other utensil may be readily placed in position in the support and as readily removed therefrom, as will be hereinafter more particularly described.

In the drawings Figure 1 is a plan of a pot lid fitted with a handle and utensil support comprising my present invention, Fig. 2 is an enlarged section and partial elevation on line 2—2, Fig. 1, Fig. 3 is a partial section and elevation showing another form of the invention, Fig. 4 is a sectional elevation showing the utensil support applied directly to the pot lid, Fig. 5 is a plan showing another form of the invention in which the utensil support is applied directly to the lid, and Fig. 6 is a section on line 6—6, Fig. 5.

In the drawings 10 represents a lid of a pot, pan or other utensil. As is customary the lid may be made of metal or any suitable material and in configuration conforms to the shape of the vessel with which it is to be employed. Although such vessels and lids therefor are usually circular, and for this reason a circular lid is illustrated, nevertheless, the lid may be of any configuration to adapt itself to a correspondingly shaped vessel and the present invention applied thereto.

In the form of the invention as shown in Figs. 1, 2 and 3 the lid is provided in a centrally disposed position with a knob 11 which may be made of wood, or porcelain, or any other equally good heat insulating material and which is connected thereto by a pin or rivet 12 in the customary, or any suitable manner. In the preferred form of the invention as shown in Figs. 1 and 2 the knob forms part of the handle and is fitted with a divided band forming a support and rest for a spoon or other utensil. In these figures the support is made of a flat strip of metal shaped to have a substantially straight section 13 to lie against the outer face of the knob and to be connected thereto and the lid by the pin or rivet 12. From one end of the section 13 there extends an upwardly and inwardly curved arm 14. From the other end of the section 13 there is formed a loop or bail 15, terminating at a point adjacent the end of the arm 14 and providing therebetween a space 16 for the entrance of the shank of the spoon or other utensil. Now as will be understood, the utensil rest and support is of such dimensions as to receive and retain the shank of the spoon or other utensil in such a manner that the shank is longitudinally slidable or otherwise movable therein in order when not in use to permit the bowl of the spoon to rest in the curved peripheral portion of the lid, or to rest against any other portion thereof; also that the shank of the spoon may be drawn through the support and rest member to bring the bowl of the spoon adjacent thereto, when as will be understood, the spoon handle may be utilized to lift the lid from and replace the lid on a pot, or pan, or other vessel during cooking operations. It will be equally apparent that the spoon may be readily placed in position in the support or rest member and as easily withdrawn therefrom for use in stirring the contents of the pot or vessel when occasion requires the same, and that then the spoon or other utensil may be returned to its position in the support or rest member.

The support or rest member may be secured to the lid or the knob on the lid in many different ways. For example in addition to that shown in Figs. 1 and 2 the knob 11 adjacent the outer end thereof may be provided with a transverse bore through which a substantially straight section or base 17 of the utensil support may be caused to pass, and set up from one end thereof is an arm 18 while a loop 19 extends from the opposite end thereof. As in the other instance the extremity of the loop 19 is caused to lie adjacent the extremity of the arm 18 with a space 20 between them sufficient to admit the shank of a spoon or other utensil.

In this form of the invention the support or rest member as illustrated may be made of metal wire of a sufficiently heavy gauge to answer the purpose.

As illustrated in Fig. 4 and as will be understood the knob of insulating material may be dispensed with entirely, in which instance the support or rest member is connected directly to the lid. As illustrated in this form of the invention the support or rest member is provided with a substantially straight section 21 and the same is connected to the lid 10 by means of a rivet 22 or otherwise. As in the other forms of the invention from one end of the section 21 there is an upwardly and inwardly extending arm 23, while from the opposite end of the section 21 there is a loop 24. The extremity of the loop 24 lies adjacent the extremity of the arm 23 providing a space 25 between them for the entrance of the shank of a spoon or other utensil. In this form of the invention the support or rest member is preferably made of a section of relatively thin, flat metal like that shown in Figs. 1 and 2.

Then again, for example as shown in Figs. 5 and 6, a piece of wire of suitable gauge may be employed for the support and rest member and connected to the lid by providing the latter with suitably spaced slots and a rib or section 26 beneath which the substantially straight section 27 of the support and rest member extends. Extending from one end of this section 27 there is an upwardly and inwardly extending arm 28, while from the opposite end there extends a loop 29. The extremity of the loop lies adjacent the extremity of the arm, providing therebetween a space 30 for the entrance and removal of the shank of a spoon or other utensil.

I claim as my invention:

1. In a device of the class described, a pot lid, a utensil support comprising a base forming a relatively straight section, an upwardly and inwardly extending arm at one end of the straight section, and a loop from the other end of the straight section with the extremity of the loop lying adjacent the extremity of the arm, providing therebetween a space for the admission of the shank of a spoon or other utensil, said utensil support acting as a fulcrum point to maintain the handle of the spoon or other utensil in an upwardly direction.

2. In a device of the class described, a pot lid, a knob connected thereto, a utensil support connected to the knob and comprising a substantially straight base section, a knob extending upwardly and inwardly from one end of the base section, and a loop extending from the opposite end of the base section with its extremity lying adjacent the extremity of the said arm with a space therebetween for the entrance of the shank of a spoon or other utensil, said utensil support acting as a fulcrum point to maintain the handle of the spoon or other utensil in an upwardly direction.

3. In a device of the class described, a pot lid, a handle comprising a knob of heat insulating material secured to the lid, and a utensil support made of a split band having a substantially straight base section connected to the knob, an arm extending upwardly and inwardly from one extremity of the base section, and a loop extending from the other extremity of the base section with the end of the loop lying adjacent the end of the arm and having a space therebetween for the entrance of the shank of a spoon or other utensil, said utensil support acting as a fulcrum point to maintain the handle of the spoon or other utensil in an upwardly direction.

Signed by me this 12th day of January, 1929.

JOSEPH B. ESTES.